(12) United States Patent
Schmick

(10) Patent No.: US 10,284,044 B1
(45) Date of Patent: May 7, 2019

(54) METHODS AND APPARATUS FOR GENERATING ELECTRICAL POWER ON AIRCRAFT ROTOR HEADS

(71) Applicant: The Boeing Company, Chicago, IL (US)

(72) Inventor: Daniel R. Schmick, Newark, DE (US)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 15/840,946

(22) Filed: Dec. 13, 2017

(51) Int. Cl.
*B64C 27/32* (2006.01)
*H02K 3/51* (2006.01)

(52) U.S. Cl.
CPC ............... *H02K 3/51* (2013.01); *B64C 27/32* (2013.01); *F05B 2240/923* (2013.01)

(58) Field of Classification Search
CPC .... B64C 27/00; B64C 27/32; F05B 2240/923
See application file for complete search history.

(56) References Cited

U.S. PATENT DOCUMENTS

| 4,277,789 A * | 7/1981 | Goodman, Jr. ......... B64C 27/00 333/261 |
| 7,802,755 B2 | 9/2010 | Poltorak |
| 7,868,477 B2 | 1/2011 | Nilsson |
| 2014/0227095 A1* | 8/2014 | Minutin ................ F03D 1/0608 416/9 |
| 2016/0023751 A1* | 1/2016 | Lee ...................... B64C 27/021 701/2 |
| 2019/0023397 A1* | 1/2019 | Gang ..................... B64C 27/08 |

* cited by examiner

*Primary Examiner* — Joseph W Sanderson
(74) *Attorney, Agent, or Firm* — Hanley, Flight & Zimmerman, LLC

(57) ABSTRACT

Methods and apparatus for generating electrical power on aircraft rotor heads are disclosed. The apparatus includes a rotor assembly and a stator assembly. The rotor assembly is rigidly coupled to a rotor head of an aircraft. The rotor assembly is to rotate at a first rate as the rotor head rotates at the first rate. The stator assembly is rotatably coupled to the rotor assembly. The stator assembly includes a stabilizer to aerodynamically resist rotation of the stator assembly. The stabilizer is to cause the stator assembly to rotate at a second rate less than the first rate.

20 Claims, 12 Drawing Sheets

METHODS AND APPARATUS FOR GENERATING ELECTRICAL POWER ON AIRCRAFT ROTOR HEADS

FIELD OF THE DISCLOSURE

This disclosure relates generally to aircraft rotor heads and, more specifically, to methods and apparatus for generating electrical power on aircraft rotor heads.

BACKGROUND

Electrical devices may be mounted on rotor blades and/or other rotating portions of a rotor system (e.g., a rotor head) of an aircraft (e.g., a helicopter). For example, one or more electrically-powered transmitter(s), receiver(s), and/or sensor(s) mounted at various points along a rotor blade and/or on a rotor head of an aircraft may be utilized for data collection (e.g., in connection with flight testing operations). As another example, one or more electrically-powered light(s) mounted at a tip of a rotor blade of an aircraft may be utilized as a safety enhancement (e.g., to provide a light ring corresponding to the outer limits of a travel path of the rotor blade). Supplying electrical power to such electrical devices is complicated by the fact that the rotor blades are rigidly and/or fixedly coupled to a rotor head of the aircraft that rotates while the aircraft is operating.

SUMMARY

Methods and apparatus for generating electrical power on aircraft rotor heads are disclosed herein. In some examples, an apparatus is disclosed. In some disclosed examples, the apparatus comprises a rotor assembly and a stator assembly. In some disclosed examples, the rotor assembly is rigidly coupled to a rotor head of an aircraft. In some disclosed examples, the rotor assembly is to rotate at a first rate as the rotor head rotates at the first rate. In some disclosed examples, the stator assembly is rotatably coupled to the rotor assembly. In some disclosed examples, the stator assembly includes a stabilizer to aerodynamically resist rotation of the stator assembly. In some disclosed examples, the stabilizer is to cause the stator assembly to rotate at a second rate less than the first rate.

In some examples, an aircraft is disclosed. In some disclosed examples, the aircraft comprises a rotor head, a rotor assembly, and a stator assembly. In some disclosed examples, the rotor assembly is rigidly coupled to the rotor head. In some disclosed examples, the rotor assembly is to rotate at a first rate as the rotor head rotates at the first rate. In some disclosed examples, the rotor assembly includes a base, a first annulus extending transversely from the base, and a second annulus extending transversely from the base and circumscribing the first annulus. In some disclosed examples, the stator assembly is rotatably coupled to the rotor assembly. In some disclosed examples, the stator assembly includes a stabilizer to aerodynamically resist rotation of the stator assembly. In some disclosed examples, the stabilizer is to cause the stator assembly to rotate at a second rate less than the first rate. In some disclosed examples, the stator assembly further includes a lid, a core extending transversely from the lid, and a sidewall extending from the lid and circumscribing the core, the first annulus, and the second annulus. In some disclosed examples, the core is received in a bearing extending inwardly from an inner surface of the first annulus to rotatably couple the stator assembly to the rotor assembly.

In some examples, a method is disclosed. In some disclosed examples, the method comprises rotating a rotor head of an aircraft at a first rate. In some disclosed examples, the method further comprises rotating a rotor assembly at the first rate. In some disclosed examples, the rotor assembly is rigidly coupled to the rotor head. In some disclosed examples, the method further comprises rotating a stator assembly at a second rate less than the first rate. In some disclosed examples, the stator assembly is rotatably coupled to the rotor assembly. In some disclosed examples, the stator assembly includes a stabilizer to aerodynamically resist rotation of the stator assembly. In some disclosed examples, the stabilizer is to cause the stator assembly to rotate at the second rate.

Figure 1:
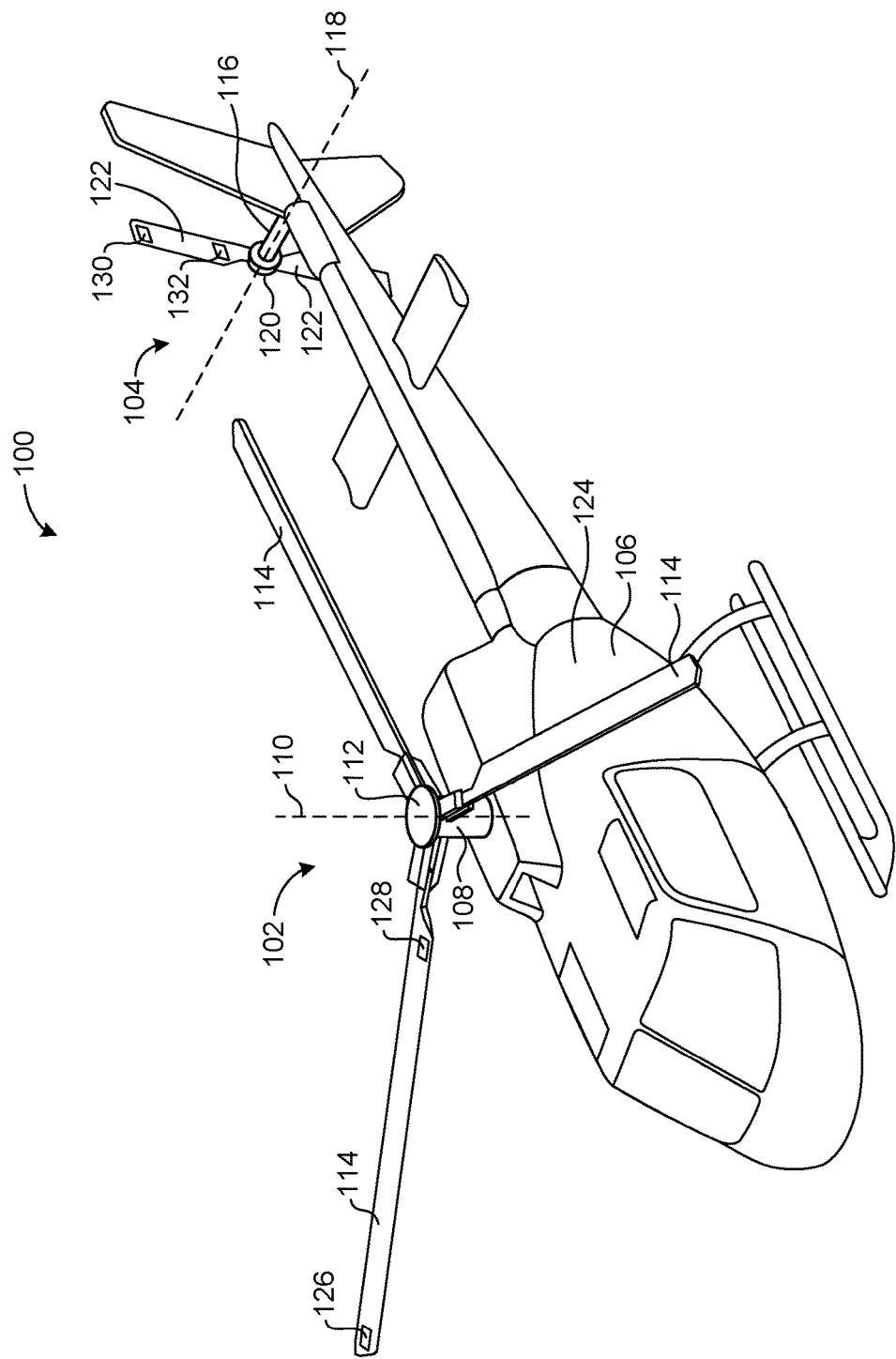
FIG. 1 illustrates an example aircraft on which an example power generating apparatus may be implemented in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Supplying electrical power to electrical devices mounted on rotor blades of an aircraft (e.g., a helicopter) is complicated by the fact that the rotor blades are rigidly and/or fixedly coupled to a rotor head of the aircraft that rotates while the aircraft is operating. Some conventional solutions for supplying electrical power to such electrical devices utilize slip rings and/or roll rings to create electrical connections having bare contacts that are always in motion at the point of contact while the aircraft is operating. The electrical connections formed via the slip rings and/or roll rings enable signals and/or current to be conveyed to and/or from the rotating rotor head. Slip ring and roll ring systems can be costly and maintenance intensive, and require a physical path somewhere around the rotating axis of the rotor system.

Other conventional solutions utilize wireless signal connections between a package attached to the rotor head and a collector located in and/or on the airframe. This arrangement enables data to be passed wirelessly to the collector and/or the airframe without the use of slip rings and/or roll rings. The lack of a physical connection to the airframe, however, necessitates that the wireless sources are equipped with their own independent battery power. This requirement limits data collection to the duration and/or life of the battery, and also requires that the battery be replaced or recharged after use.

Unlike the conventional solutions described above, the methods and apparatus disclosed herein advantageously generate electrical power on rotor heads of aircraft without requiring an electrical connection between the rotor head and the airframe of the aircraft, and without the need for independent battery power. The disclosed methods and apparatus for generating electrical power on rotor heads of aircraft implement a rotor assembly that is rigidly coupled to the rotor head of the aircraft, and a stator assembly that is rotatably coupled to the rotor assembly. The rotor assembly rotates at a first rate as the rotor head rotates at the first rate. The stator assembly includes a stabilizer to aerodynamically resist rotation of the stator assembly. The stabilizer causes the stator assembly to rotate at a second rate less than the first rate.

In some disclosed examples, the rotor assembly includes a current generating coil and the stator assembly includes a magnet. The current generating coil rotates relative to the magnet based on a difference between the first rate at which the rotor assembly rotates and the second rate at which the stator assembly rotates. The current generating coil generates electrical power at the rotor head in response to the difference between the first rate and the second rate. The current generating coil is not electrically coupled to the airframe of the aircraft. Electrical power generated by the current generating coil may be provided to an electrical device mounted on a rotor blade coupled to the rotor head of the aircraft.

The disclosed methods and apparatus generate electrical power on rotor heads of aircraft in a manner that advantageously requires less maintenance and is less costly relative to the conventional slip ring and/or roll ring systems described above. The disclosed methods and apparatus also generate electrical power on rotor heads of aircraft in a manner that advantageously avoids the down time associated with replacing and/or recharging batteries, or having to limit flight times to the duration of a battery, as is typically necessary in the conventional wireless systems described above.

FIG. 1 illustrates an example aircraft 100 on which an example power generating apparatus (e.g., the power generating apparatus 200 of FIGS. 2-11) may be implemented in accordance with the teachings of this disclosure. The aircraft 100 of FIG. 1 is a helicopter. The aircraft 100 includes an example main rotor 102, an example tail rotor 104, and an example airframe 106. The main rotor 102 of FIG. 1 includes an example rotor shaft 108 having an example axis of rotation 110, an example rotor head 112 coupled to the rotor shaft 108, and example rotor blades 114 coupled to the rotor head 112. The tail rotor 104 of FIG. 1 includes an example rotor shaft 116 having an example axis of rotation 118, an example rotor head 120 coupled to the rotor shaft 116, and example rotor blades 122 coupled to the rotor head 120. The rotor shaft 108 of the main rotor 102 and/or the rotor shaft 116 of the tail rotor 104 is/are coupled to the airframe 106. The rotor shaft 108 of the main rotor 102 and/or the rotor shaft 116 of the tail rotor 104 is/are mechanically driven and/or rotated via a transmission located within an example fuselage 124 of the airframe 106.

In some examples, the power generating apparatus disclosed herein may be implemented in connection with the rotor head 112 of the main rotor 102 of FIG. 1. For example, the disclosed power generating apparatus may be mechanically coupled to the rotor head 112 of the main rotor 102. In some such examples, the disclosed power generating apparatus may advantageously generate electrical power for, and/or provide electrical power to, one or more electrical device(s) (e.g., transmitters, receivers, sensors, lights, etc.) mounted on the rotor blades 114 of the main rotor 102 of FIG. 1. For example, the disclosed power generating apparatus may generate electrical power for and provide electrical power to (e.g., via a wired connection) a light located proximate an example tip portion 126 of one of the rotor blades 114 of the main rotor 102. As another example, the disclosed power generating apparatus may generate electrical power for and provide electrical power to (e.g., via a wired connection) a sensor located proximate an example base portion 128 of one of the rotor blades 114 of the main rotor 102. The disclosed power generating apparatus advantageously provides electrical power to such electrical device(s) without the electrical device(s), the rotor blades 114, and/or the rotor head 112 of the main rotor 102 of FIG. 1 being electrically coupled to the airframe 106 of the aircraft 100 of FIG. 1.

In other examples, the power generating apparatus disclosed herein may be implemented in connection with the rotor head 120 of the tail rotor 104 of FIG. 1. For example, the disclosed power generating apparatus may be mechanically coupled to the rotor head 120 of the tail rotor 104. In some such other examples, the disclosed power generating apparatus may advantageously generate electrical power for, and/or provide electrical power to, one or more electrical device(s) (e.g., transmitters, receivers, sensors, lights, etc.) mounted on the rotor blades 122 of the tail rotor 104 of FIG. 1. For example, the disclosed power generating apparatus may generate electrical power for and provide electrical power to (e.g., via a wired connection) a light located proximate an example tip portion 130 of one of the rotor blades 122 of the tail rotor 104. As another example, the disclosed power generating apparatus may generate electrical power for and provide electrical to (e.g., via a wired connection) a sensor located proximate an example base portion 132 of one of the rotor blades 122 of the tail rotor 104. The disclosed power generating apparatus advantageously provide electrical power to such electrical device(s) without the electrical device(s), the rotor blades 122, and/or the rotor head 120 of the tail rotor 104 of FIG. 1 being electrically coupled to the airframe 106 of the aircraft 100 of FIG. 1.

While the example of FIG. 1 described above is directed to an aircraft 100 in the form of a helicopter, the power generating apparatus disclosed herein may be implemented in other types and/or forms of aircraft including, for example, manned and/or unmanned aircraft (e.g., airplanes, drones, etc.).

Figure 2:
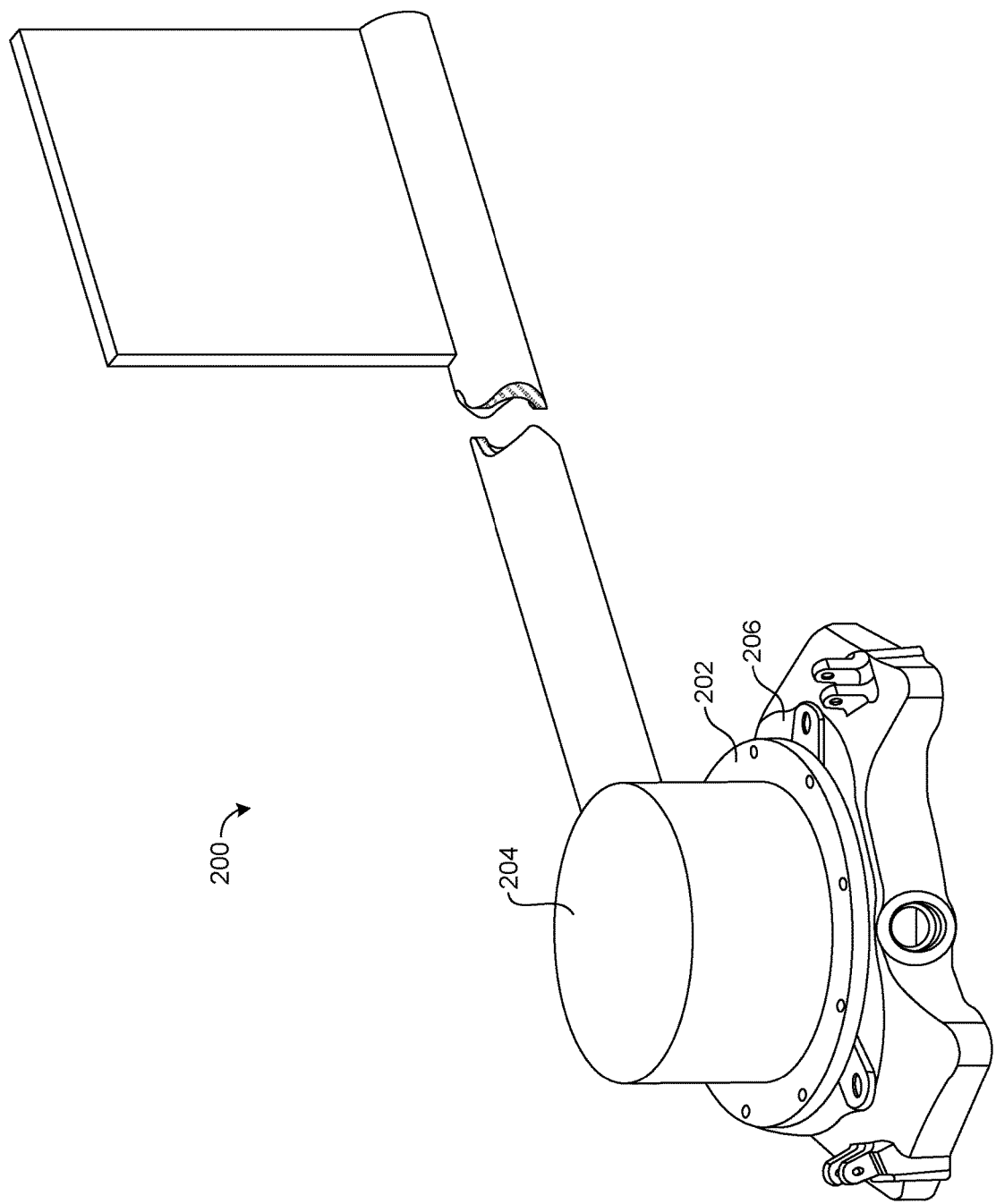
FIG. 2 is a perspective view of an example power generating apparatus constructed in accordance with the teachings of this disclosure.
Figure 3:
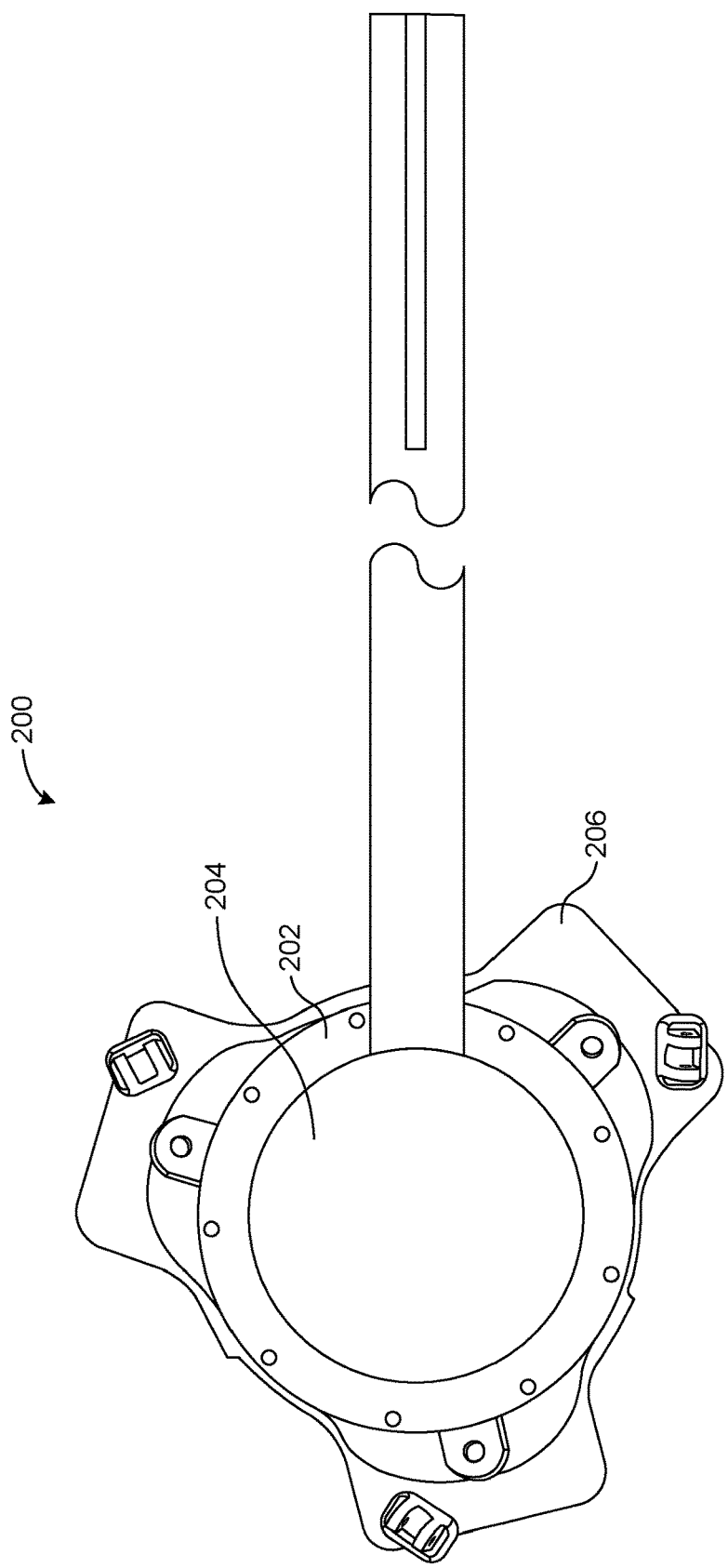
FIG. 3 is a plan view of the example power generating apparatus of FIG. 2.

FIG. 2 is a perspective view of an example power generating apparatus 200 constructed in accordance with the teachings of this disclosure. FIG. 3 is a plan view of the example power generating apparatus of FIG. 2. In the illustrated example of FIGS. 2 and 3, the power generating apparatus 200 includes an example rotor assembly 202 and an example stator assembly 204.

The rotor assembly 202 of FIGS. 2 and 3 may be rigidly coupled to an example rotor head 206 via one or more fasteners (e.g., bolts, screws, rivets, etc.) such that the rotor assembly 202 rotates as the rotor head 206 rotates. The rotor head 206 of FIGS. 2 and 3 may be implemented as either a rotor head of a main rotor (e.g., the rotor head 112 of the main rotor 102 of FIG. 1), or as a rotor head of a tail rotor (e.g., the rotor head 120 of the tail rotor 104 of FIG. 1).

The stator assembly 204 of FIGS. 2 and 3 is rotatably coupled to the rotor assembly 202 of FIGS. 2 and 3. In some examples, the rotor assembly 202 rotates at a first rate (e.g., two hundred revolutions per minute) that matches the rate of rotation of the rotor head 206, and the stator assembly 204 rotates at a second rate (e.g., one revolution per minute) that is less (e.g., substantially less) than the first rate at which the rotor assembly 202 rotates. In some examples, the second rate at which the stator assembly 204 rotates may effectively be zero. For example, the stator assembly 204 may remain stationary while the rotor assembly 202 rotates along with the rotor head 206.

In the illustrated example of FIGS. 2 and 3, the power generating apparatus 200 generates electrical power at and/or on the rotor head 206 in response of the rotor assembly 202 rotating relative to the stator assembly 204. The power generating apparatus 200 of FIGS. 2 and 3 advantageously generates electrical power at and/or on the rotor head 206 of FIGS. 2 and 3 without any electrical connection to an airframe of an aircraft (e.g., without any electrical connection to the airframe 106 of the aircraft 100 of FIG. 1). In some examples, electrical power generated by the power generating apparatus 200 of FIGS. 2 and 3 may be supplied and/or provided (e.g., via a wired connection) to one or more electrical device(s) (e.g., transmitters, receivers, sensors, lights, etc.) located on one or more rotor blades that may be coupled to the rotor head 206 of FIGS. 2 and 3. The rotor assembly 202 of the power generating apparatus 200 of FIGS. 2 and 3 is further described below in connection with FIGS. 4-6. The stator assembly 204 of the power generating apparatus 200 of FIGS. 2 and 3 is further described below in connection with FIGS. 7-10.

Figure 4:
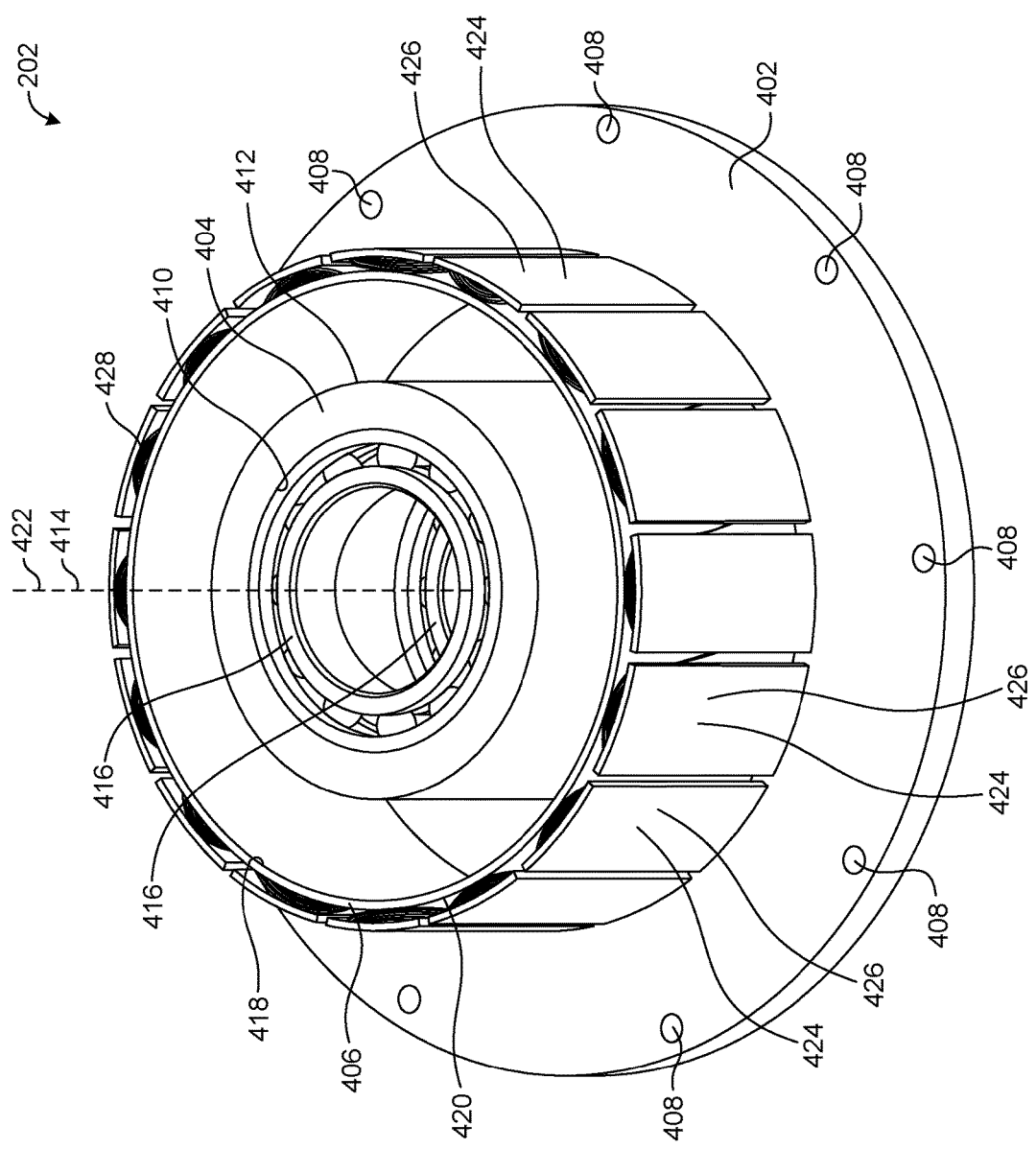
FIG. 4 is a perspective view of the example rotor assembly of the example power generating apparatus of FIGS. 2 and 3.
Figure 5:
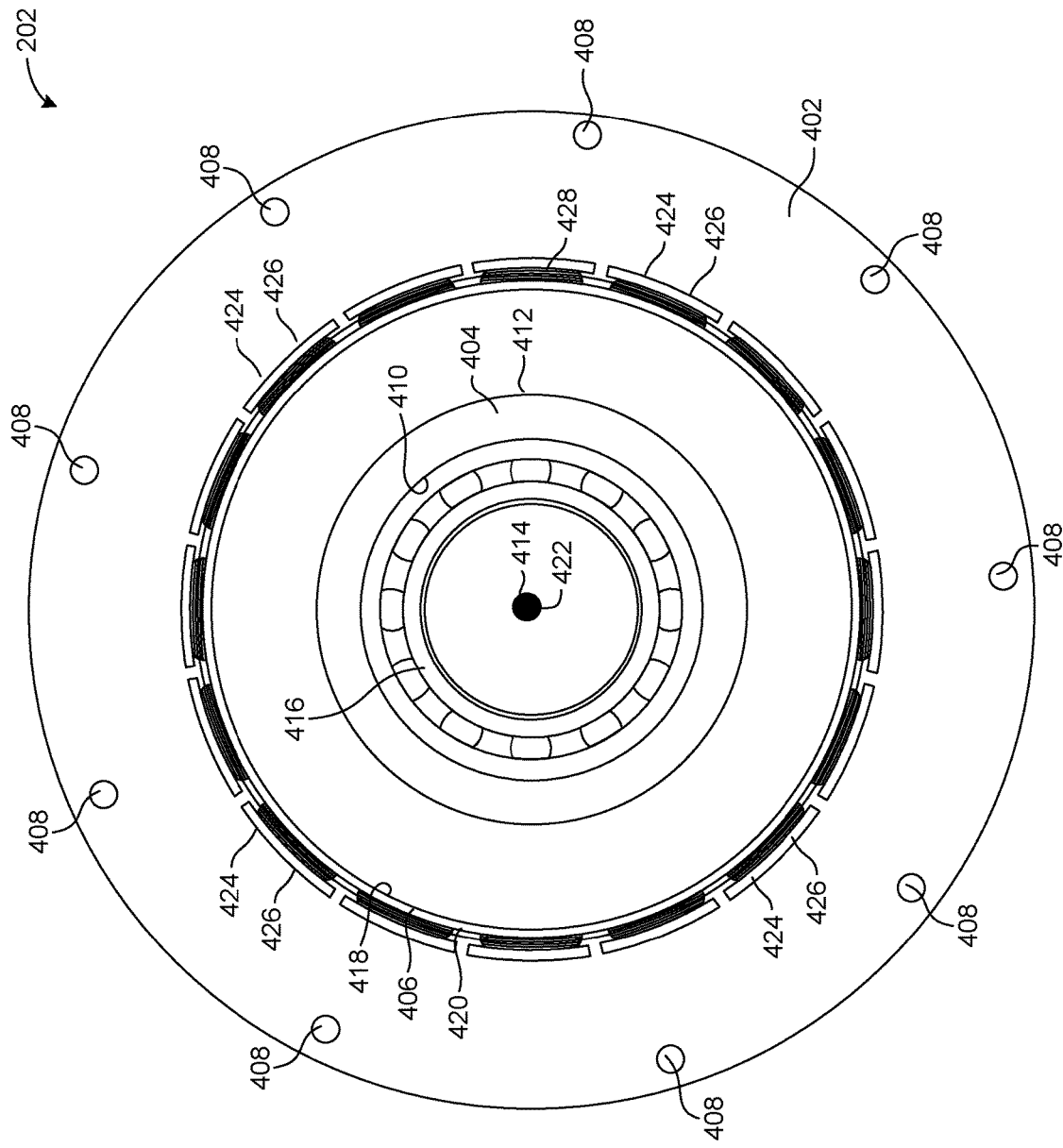
FIG. 5 is a plan view of the example rotor assembly of FIGS. 2-4.
Figure 6:
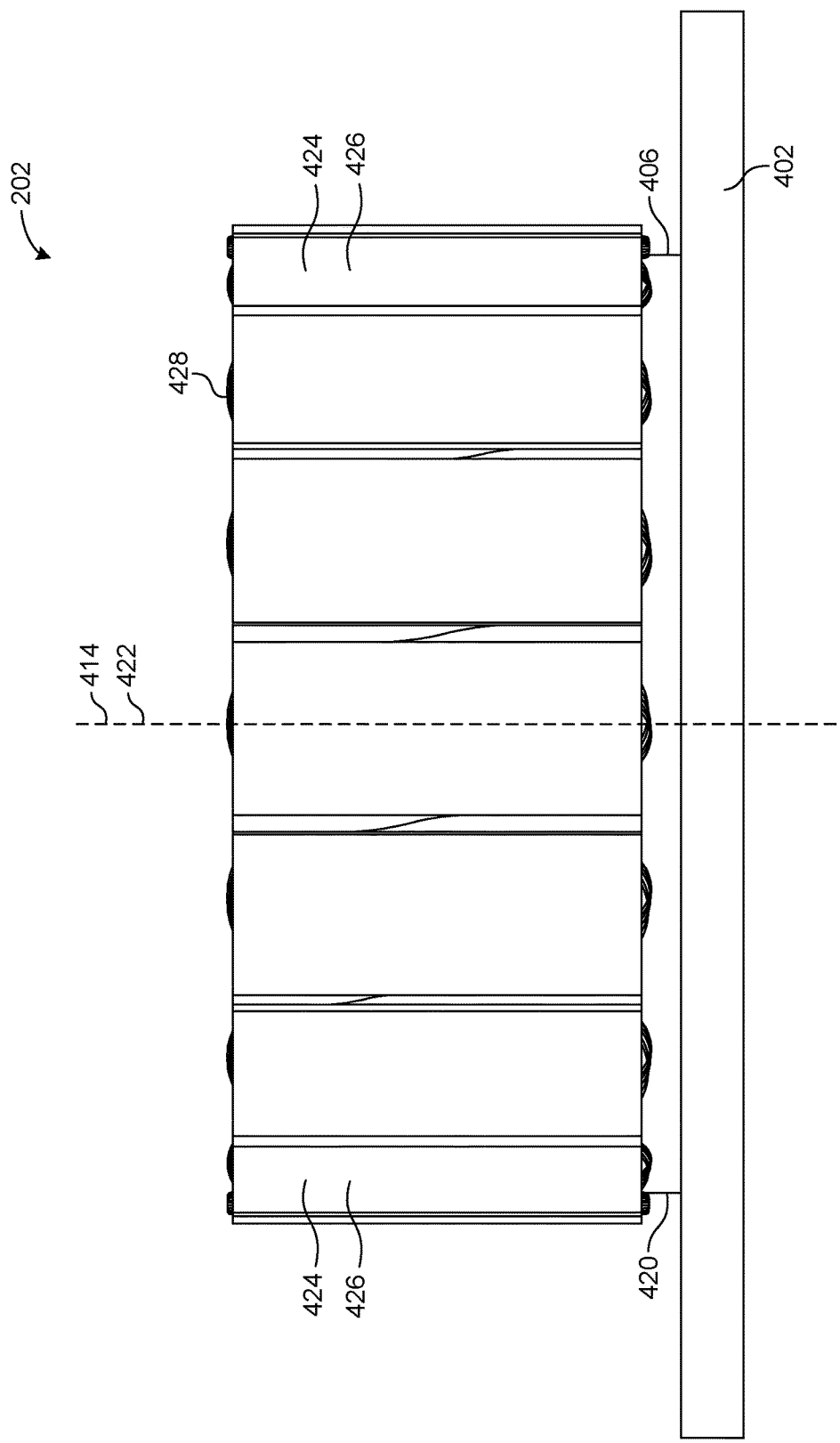
FIG. 6 is a side view of the example rotor assembly of FIGS. 2-5.

FIG. 4 is a perspective view of the example rotor assembly 202 of the example power generating apparatus 200 of FIGS. 2 and 3. FIG. 5 is a plan view of the example rotor assembly 202 of FIGS. 2-4. FIG. 6 is a side view of the example rotor assembly 202 of FIGS. 2-5. In the illustrated example of FIGS. 2-6, the rotor assembly 202 includes an example base 402, a first example annulus 404, and a second example annulus 406.

The base 402 of FIGS. 4-6 supports and/or carries the first annulus 404 and the second annulus 406 of the rotor assembly 202 of FIGS. 4-6. The base 402 includes example through holes 408 to receive corresponding fasteners to rigidly couple the rotor assembly 202 to a rotor head (e.g., the rotor head 206 of FIGS. 2 and 3). When coupled to a rotor head, the base 402 and/or, more generally, the rotor assembly 202 of FIGS. 2-6 rotates as the rotor head rotates (e.g., the rate of rotation of the base matches the rate of rotation of the rotor head). In the illustrated example of FIGS. 4-6, the base 402 has a shape resembling a circular disc. In other examples, the base 402 may have a different shape.

The first annulus 404 of FIGS. 4-6 extends transversely from the base 402 of the rotor assembly 202 of FIGS. 4-6. The first annulus 404 includes an example inner surface 410, an example outer surface 412 located opposite the inner surface 410 of the first annulus 404, and an example central axis 414. In some examples, the first annulus 404 may be formed from a plurality of arc-shaped segments having the same radius of curvature. In other examples, the first annulus 404 may be formed as a one-piece cylindrical structure. In some examples, the first annulus 404 may be integrally formed with the base 402. In other examples, the first annulus 404 may be coupled, mounted, and/or bonded to the base 402 via one or more fastener(s), weld(s), adhesive(s), etc. In some examples, the central axis 414 of the first annulus 404 of FIGS. 4-6 may be coaxially aligned with an axis of rotation of a rotor shaft (e.g., the axis of rotation 110 of the rotor shaft 108 of FIG. 1) to which the rotor head 206 of FIGS. 2 and 3 is coupled.

In the illustrated examples of FIGS. 4-6, the inner surface 410 of the first annulus 404 is shaped and/or configured to support and/or carry one or more example bearing(s) 416. As further described below in connection with FIGS. 7-10, the bearing(s) 416 of FIGS. 4-6 is/are shaped and/or configured to receive (e.g., via a press fit) a core of the stator assembly 204 of FIGS. 2 and 3 to rotatably couple the stator assembly 204 to the rotor assembly 202.

The second annulus 406 of FIGS. 4-6 also extends transversely from the base 402 of the rotor assembly 202 of FIGS. 4-6. In the illustrated example of FIGS. 4-6, the second annulus 406 circumscribes the first annulus 404 and is radially spaced apart therefrom. The second annulus 406 includes an example inner surface 418, an example outer surface 420 located opposite the inner surface 418 of the second annulus 406, and an example central axis 422. In some examples, the second annulus 406 may be formed from a plurality of arc-shaped segments having the same radius of curvature. In other examples, the second annulus 406 may be formed as a one-piece cylindrical structure. In some examples, the second annulus 406 may be integrally formed with the base 402. In other examples, the second annulus 406 may be coupled, mounted, and/or bonded to the base 402 via one or more fastener(s), weld(s), adhesive(s), etc. In the illustrated example of FIGS. 4-6, the central axis 422 of the second annulus 406 is coaxially aligned with the central axis 414 of the first annulus 404.

The outer surface 420 of the second annulus 406 of FIGS. 4-6 is shaped and/or configured to support and/or carry example flanges 424. The flanges 424 are spaced about the outer surface 420 of the second annulus 406 of FIGS. 4-6 and extend outwardly (e.g., radially and/or transversely) therefrom. In some examples, respective ones of the flanges 424 have an example contoured and/or curved outer surface 426. In some examples, the flanges 424 may be integrally formed with the second annulus 406. In other examples, the flanges 424 may be coupled and/or mounted to the second annulus 406 (e.g., to the outer surface 420 and/or the inner surface 418 of the second annulus 406) via one or more fasteners.

In the illustrated example of FIGS. 4-6, the flanges 424 are shaped and/or configured to receive, hold, and/or confine one or more wire(s) that are wrapped, wound, and/or coiled around the outer surface 420 of the second annulus 406. In some examples, the wire(s) may be wrapped and/or wound around the flanges 424 in addition to being wrapped and/or wound around the outer surface 420 of the second annulus 406. In some examples, the wire(s) wrapped, wound, and/or coiled around the outer surface 420 and/or the flanges 424 of the second annulus 406 form an example current generating coil 428. As further described below in connection with FIGS. 7-10, the current generating coil 428 of the rotor assembly 202 is to generate and/or provide electrical power in response to the current generating coil 428 rotating relative to one or more magnet(s) of the stator assembly 204.

In some examples, electrical power generated by the current generating coil 428 of the rotor assembly 202 of FIGS. 2-6 may be supplied and/or provided (e.g., via a wired connection) to one or more electrical device(s) (e.g., transmitters, receivers, sensors, lights, etc.) located on one or more rotor blades that may be coupled to a rotor head (e.g., the rotor head 206 of FIGS. 2 and 3). The current generating coil 428 of the rotor assembly 202 advantageously generates electrical power at and/or on a rotor head (e.g., the rotor head 206 of FIGS. 2 and 3) without any electrical connection to an airframe of an aircraft (e.g., without any electrical connection to the airframe 106 of the aircraft 100 of FIG. 1).

Figure 7:
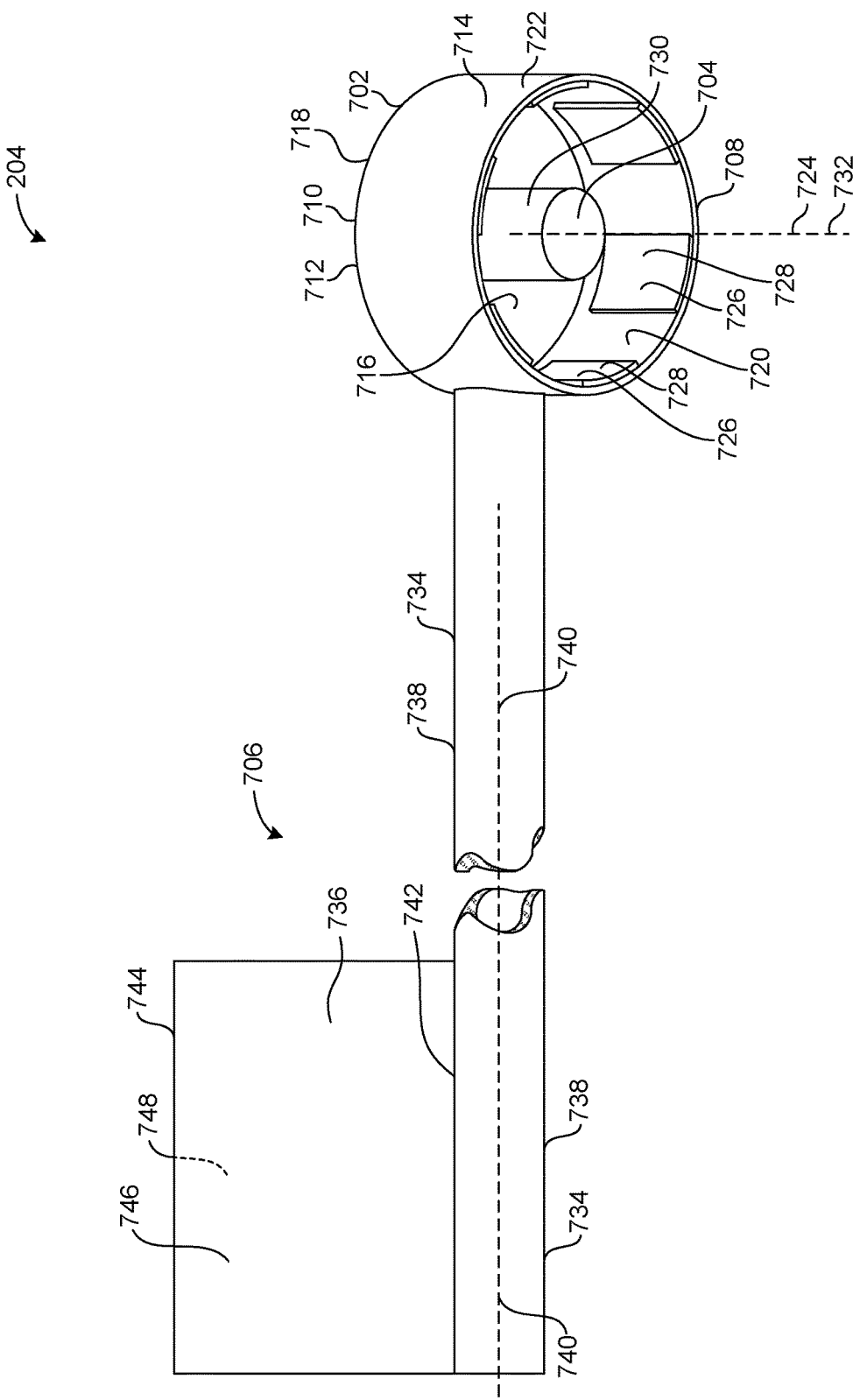
FIG. 7 is a first perspective view of the example stator assembly of the example power generating apparatus of FIGS. 2 and 3.
Figure 8:
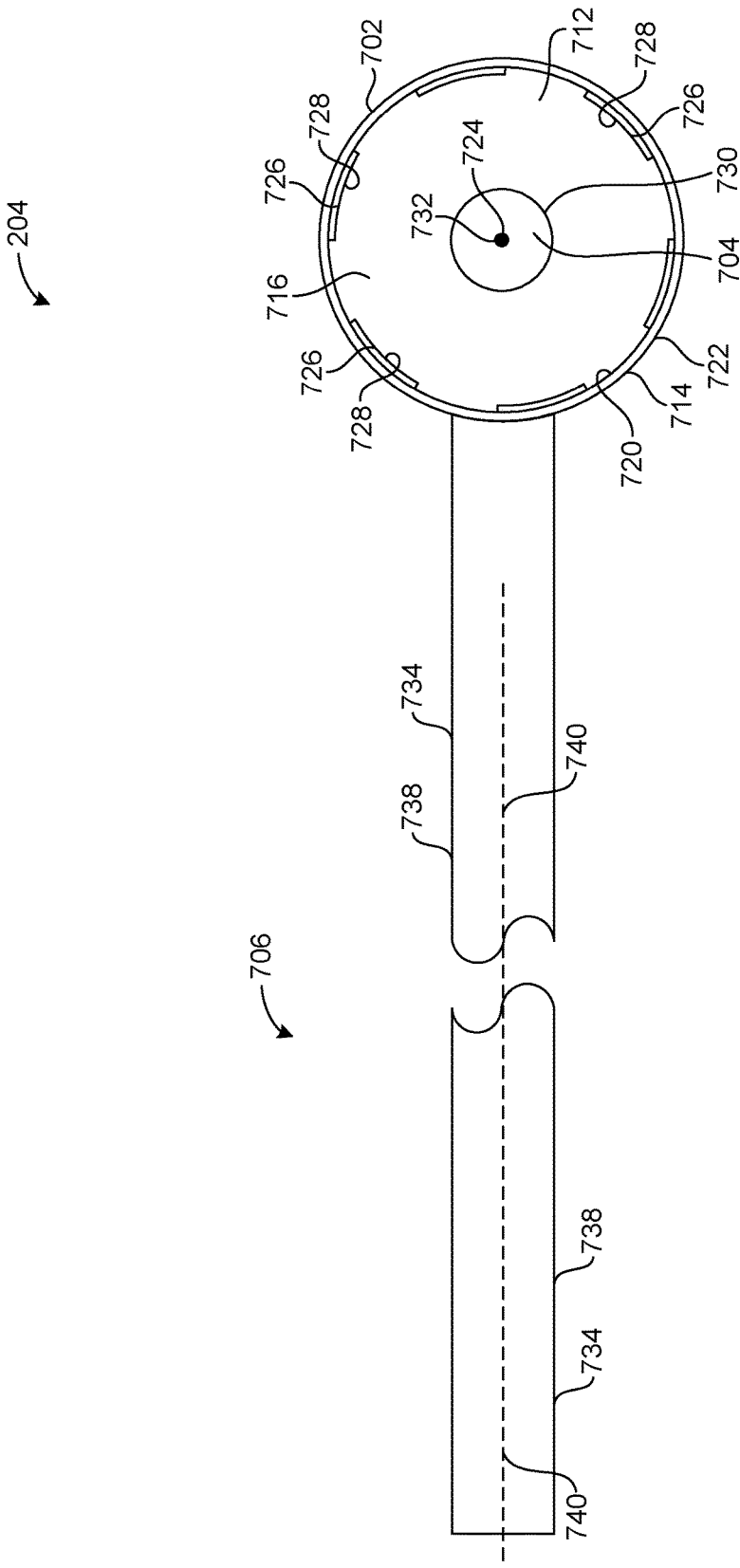
FIG. 8 is a plan view of the example stator assembly of FIGS. 2, 3 and 7.
Figure 9:
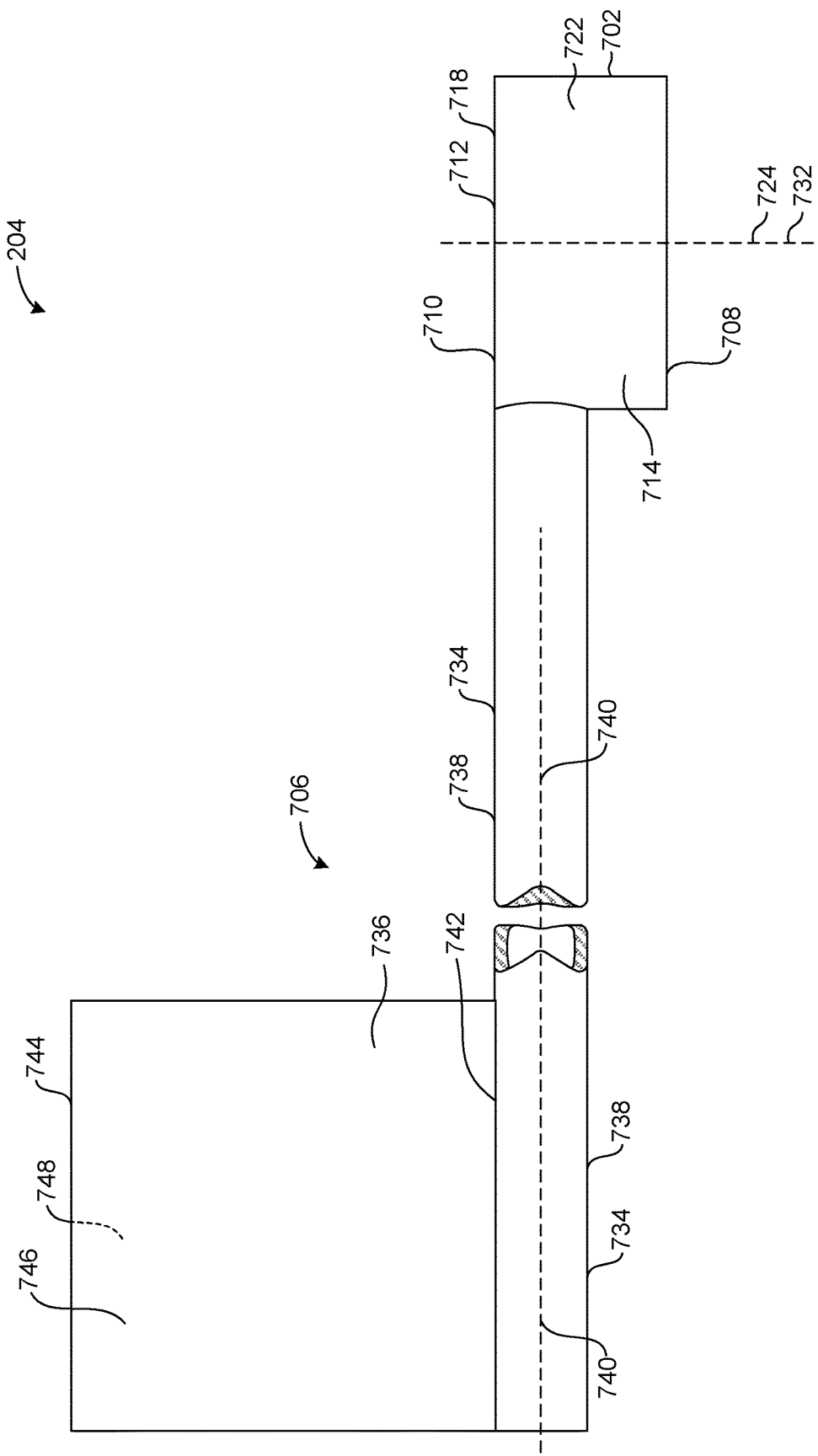
FIG. 9 is a side view of the example stator assembly of FIGS. 2, 3, 7 and 8.
Figure 10:
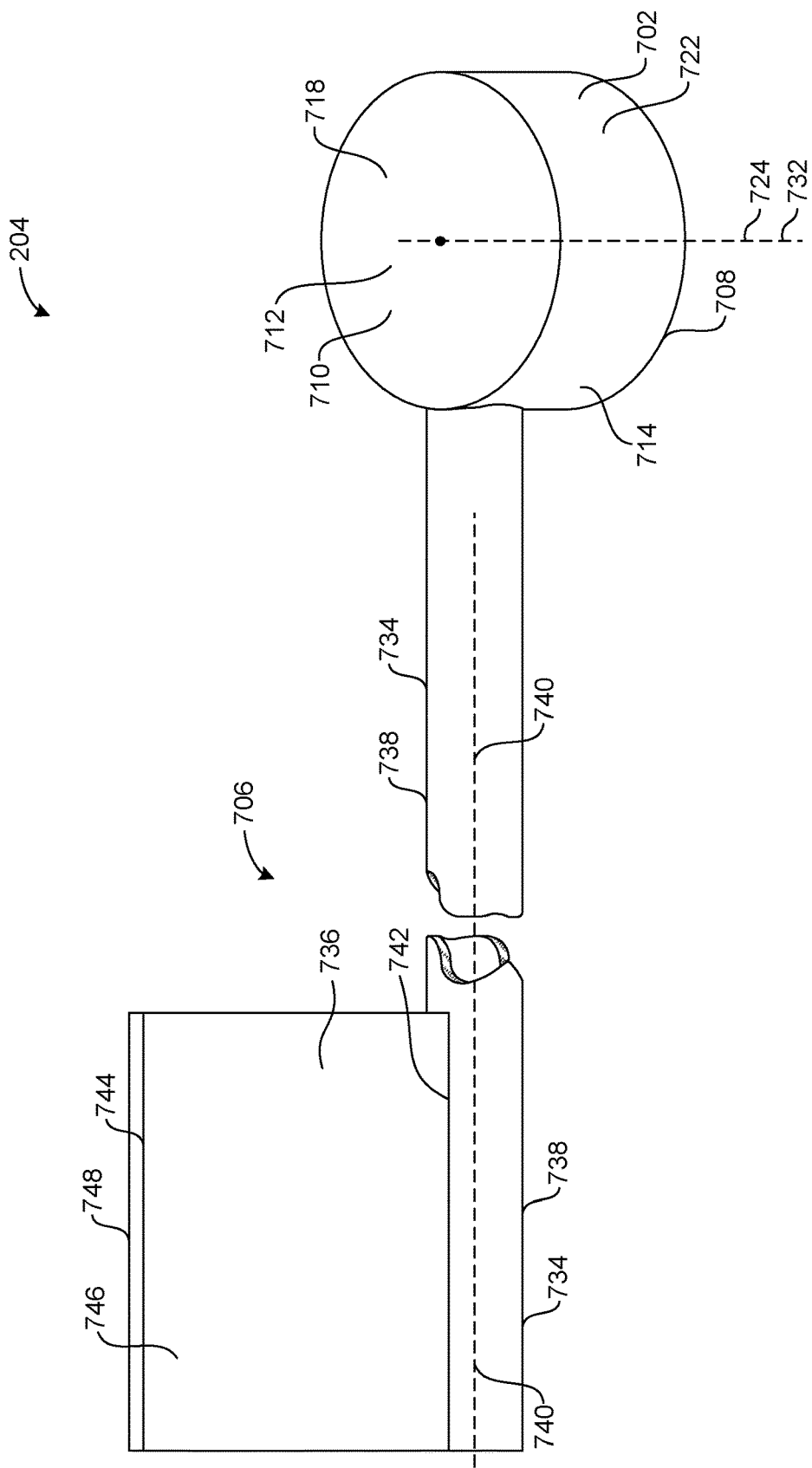
FIG. 10 is a second perspective view of the example stator assembly of FIGS. 2, 3, 7, 8 and 9.

FIG. 7 is a first perspective view of the example stator assembly 204 of the example power generating apparatus 200 of FIGS. 2 and 3. FIG. 8 is a plan view of the example stator assembly 204 of FIGS. 2, 3 and 7. FIG. 9 is a side view of the example stator assembly 204 of FIGS. 2, 3, 7 and 8. FIG. 10 is a second perspective view of the example stator assembly 204 of FIGS. 2, 3, 7, 8 and 9. In the illustrated example of FIGS. 2, 3 and 7-10, the stator assembly 204 includes an example housing 702, an example core 704, and an example stabilizer 706.

The housing 702 of FIGS. 7-10 supports and/or carries the core 704 and the stabilizer 706 of the stator assembly 204 of FIGS. 7-10. In the illustrated example of FIGS. 7-10, the housing 702 includes an example first end 708, an example second end 710 located opposite the first end 708, an example lid 712 located at the second end 710, and an example sidewall 714 extending between the first end 708 and the second end 710. When the stator assembly 204 is coupled to the rotor assembly 202, the first end 708 of the housing 702 is positioned toward the base 402 of the rotor assembly 202, and the second end 710 and/or the lid 712 of the housing 702 is positioned away from the base 402 of the rotor assembly 202.

In some examples, the first end 708 of the housing 702 is open (e.g., an open end), the second end 710 and/or the lid 712 of the housing 702 is closed (e.g., a closed end), and the sidewall 714 of the housing 702 is closed. In such examples, the lid 712, the sidewall 714, and/or, more generally, the housing 702 of FIGS. 7-10 cover(s), confine(s), and/or house(s) the first annulus 404 and the second annulus 406 of the rotor assembly 202 of FIGS. 4-6 described above. In the illustrated example of FIGS. 7-10, the housing 702 has a shape resembling a cylinder that is closed on one end (e.g., the second end 710). In other examples, the housing 702 may have a different shape.

The lid 712 of the housing 702 of FIGS. 7-10 supports and/or carries the core 704 of the stator assembly 204 of FIGS. 7-10. The lid 712 has an example inner surface 716 and an example outer surface 718 located opposite the inner surface 716 of the lid 712. When the stator assembly 204 is coupled to the rotor assembly 202, the inner surface 716 of the lid 712 faces toward the base 402 of the rotor assembly 202, and the outer surface 718 of the lid 712 faces away from the base 402 of the rotor assembly 202. In the illustrated example of FIGS. 7-10, the lid 712 has a shape resembling a circular disc. In other examples, the lid 712 may have a different shape.

The sidewall 714 of the housing 702 of FIGS. 7-10 supports and/or carries the stabilizer 706 of the stator assembly 204 of FIGS. 7-10. In the illustrated example of FIGS. 7-10, the sidewall 714 extends transversely from the lid 712 of the housing 702. The sidewall 714 circumscribes the core 704 of the stator assembly 204 and is radially spaced apart therefrom. The sidewall 714 includes an example inner surface 720, an example outer surface 722 located opposite the inner surface 720 of the sidewall 714, and an example central axis 724. In some examples, the sidewall 714 may be formed from a plurality of arc-shaped segments having the same radius of curvature. In other examples, the sidewall 714 may be formed as a one-piece cylindrical structure. In some examples, the sidewall 714 may be integrally formed with the lid 712. In other examples, the sidewall 714 may be coupled, mounted, and/or bonded to the lid 712 via one or more fastener(s), weld(s), adhesive(s), etc. In the illustrated example of FIGS. 7-10, the sidewall 714 has a cylindrical and/or annular shape. In other examples, the sidewall 714 may have a different shape.

When the stator assembly 204 is coupled to the rotor assembly 202, the inner surface 720 of the sidewall 714 faces toward the flanges 424 and/or the current generating coil 428 of the rotor assembly 202, and the outer surface 722 of the sidewall 714 faces away from the flanges 424 and/or the current generating coil 428 of the rotor assembly 202. In some examples, the central axis 724 of the sidewall 714 of FIGS. 7-10 may be coaxially aligned with an axis of rotation of a rotor shaft (e.g., the axis of rotation 110 of the rotor shaft 108 of FIG. 1) to which the rotor head 206 of FIGS. 2 and 3 is coupled. In some examples, the central axis 724 of the sidewall 714 of FIGS. 7-10 may be coaxially aligned with the central axis 414 of the first annulus 404 of the rotor assembly 202 of FIGS. 4-6, and/or with the central axis 422 of the second annulus 406 of the rotor assembly 202 of FIGS. 4-6.

The inner surface 720 of the sidewall 714 of FIGS. 7-10 is shaped and/or configured to support and/or carry example magnets 726. The magnets 726 are spaced about the inner surface 720 of the sidewall 714 of FIGS. 7-10 and extend inwardly (e.g., radially and/or transversely) therefrom. In some examples, respective ones of the magnets 726 have an example contoured and/or curved inner surface 728. In some examples, the contoured and/or curved inner surfaces 728 of the magnets 726 face toward the contoured and/or curved outer surfaces 426 of the flanges 424, and/or toward the current generating coil 428 of the rotor assembly 202 of FIGS. 4-6 described above. In some examples, the contoured and/or curved inner surfaces 728 of the magnets 726 are complementary to the contoured and/or curved outer surfaces 426 of the flanges 424. In some examples, the magnets 726 may be coupled, mounted, and/or bonded to the inner surface 720 of the sidewall 714 via one or more fastener(s), weld(s), adhesive(s), etc. In other examples, the magnets 726 may be integrally formed with the sidewall 714.

The core 704 of FIGS. 7-10 is shaped and/or configured to rotatably couple the stator assembly 204 of FIGS. 7-10 to the rotor assembly 202 of FIGS. 4-6. In the illustrated example of FIGS. 7-10, the core 704 is centrally located relative to the lid 712 of the housing 702 of the stator assembly 204. The core 704 extends transversely from the second end 710 and/or the lid 712 (e.g., the inner surface 716 of the lid 712) of the housing 702 toward the first end 708 of the housing. The core 704 includes an example outer surface 730 and an example central axis 732. In some examples, the core 704 may be formed from a plurality of arc-shaped segments having the same radius of curvature. In other examples, the core 704 may be formed as a one-piece cylindrical structure. In some examples, the core 704 may be integrally formed with the lid 712 of the housing 702. In other examples, the core 704 may be coupled, mounted, and/or bonded to the lid 712 of the housing 702 via one or more fastener(s), weld(s), adhesive(s), etc. In the illustrated example of FIGS. 7-10, the core 704 has a cylindrical shape. In other examples, the core 704 may have a different shape.

When the stator assembly 204 is coupled to the rotor assembly 202, the outer surface 730 of the core 704 faces toward the inner surface 410 of the first annulus 404 of the rotor assembly 202. The outer surface 730 of the core 704 is shaped and/or configured to be received (e.g., via a press fit) in the bearing(s) 416 carried by the first annulus 404 of the rotor assembly 202 to rotatably couple the stator assembly 204 to the rotor assembly 202. In some examples, the central axis 732 of the core 704 of FIGS. 7-10 may be coaxially aligned with the central axis 724 of the sidewall 714 of the housing 702. In some examples, the central axis 732 of the core 704 of FIGS. 7-10 may be coaxially aligned with the central axis 414 of the first annulus 404 of the rotor assembly 202 of FIGS. 4-6, and/or with the central axis 422 of the second annulus 406 of the rotor assembly 202 of FIGS. 4-6.

The stabilizer 706 of FIGS. 7-10 provides aerodynamic resistance to and/or against rotation of the stator assembly 204 of FIGS. 7-10. The stabilizer 706 includes an example shaft 734 and an example fin 736. In the illustrated example of FIGS. 7-10, the shaft 734 is coupled to and/or mounted on the sidewall 714 (e.g., the outer surface 722 of the sidewall 714) of the housing 702 and extends outwardly (e.g., radially and/or transversely) therefrom. In some examples, the shaft 734 may be integrally formed with the sidewall 714 of the housing 702. In other examples, the shaft 734 may be coupled, mounted, and/or bonded to the sidewall 714 of the housing 702 via one or more fastener(s), weld(s), adhesive(s), etc. In still other examples, the shaft 734 may be coupled to and/or mounted on the lid 712 of the housing 702.

The shaft 734 of the stabilizer 706 of FIGS. 7-10 has an example outer surface 738 and an example central axis 740. In some examples, the central axis 740 of the shaft 734 of the stabilizer 706 may be perpendicular to the central axis 724 of the sidewall 714 of the stator assembly 204 of FIGS. 7-10, and/or perpendicular to the central axis 732 of the core 704 of the stator assembly 204 of FIGS. 7-10. In some examples, the central axis 740 of the shaft 734 of the stabilizer 706 of FIGS. 7-10 may be perpendicular to the central axis 414 of the first annulus 404 of the rotor assembly 202 of FIGS. 4-6, and/or perpendicular to the central axis 422 of the second annulus 406 of the rotor assembly 202 of FIGS. 4-6.

In the illustrated example of FIGS. 7-10, the shaft 734 of the stabilizer 706 has a cylindrical shape. In other examples, the shaft 734 may have a different shape. The shaft 734 may be of any length. In some examples, the length of the shaft 734 is based on the extent and/or the degree of aerodynamic resistance that is desired from the stabilizer 706. For example, the length of the shaft 734 may be optimized based on a desired aerodynamic resistance associated with the stabilizer 706. In some examples, the length of the shaft 734 may be based on the rate of rotation (e.g., the maximum rate of rotation) of the rotor head 206 of FIGS. 2 and 3 to which the power generating apparatus 200 of FIGS. 2 and 3 is coupled. In some examples, the length of the shaft 734 may be based on a desired amount and/or level of electrical power to be generated and/or supplied by the power generating apparatus 200 of FIGS. 2 and 3.

The fin 736 of the stabilizer 706 of FIGS. 7-10 provides aerodynamic resistance to and/or against rotation of the stator assembly 204 of FIGS. 7-10. The fin 736 includes an example fixed end 742, an example free end 744 located opposite the fixed end 742, an example first surface 746 extending between the fixed end 742 and the free end 744, and an example second surface 748 located opposite the first surface 746 of the fin 736 and extending between the fixed end 742 and the free end 744. The fixed end 742 of the fin 736 is coupled to and/or mounted on the shaft 734 (e.g., the outer surface 738 of the shaft 734) of the stabilizer 706. In some examples, the fin 736 may be integrally formed with the shaft 734 of the stabilizer 706. In other examples, the fin 736 may be coupled, mounted, and/or bonded to the shaft 734 of the stabilizer 706 via one or more fastener(s), weld(s), adhesive(s), etc.

The fin 736 of FIGS. 7-10 extends outwardly from the outer surface 738 of the shaft 734 of FIGS. 7-10. In some examples, the fin 736 extends radially and/or transversely from the outer surface 738 of the shaft 734. In other examples, the fin 736 may extend at a different angle from the outer surface 738 of the shaft 734. In some examples, the fin 736 extends from the outer surface 738 of the shaft 734 in a first plane (e.g., a vertical plane) that is perpendicular to a second plane (e.g., a horizontal plane) in which a rotor head (e.g., the rotor head 206 of FIGS. 2 and 3) rotates. In other examples, the fin 736 extends from the outer surface 738 of the shaft 734 in a first plane (e.g., a non-horizontal plane) that is not parallel to a second plane (e.g., a horizontal plane) in which a rotor head (e.g., the rotor head 206 of FIGS. 2 and 3) rotates.

In the illustrated example of FIGS. 7-10, the first surface 746 and/or the second surface 748 of the fin 736 provide(s) aerodynamic resistance to and/or against rotation of the stator assembly 204 of FIGS. 7-10. For example, the first surface 746 and/or the second surface 748 of the fin 736 may provide aerodynamic resistance to and/or against rotation of the stator assembly 204 about an axis of rotation of a rotor shaft (e.g., the axis of rotation 110 of the rotor shaft 108 of FIG. 1) to which the rotor head 206 and/or the rotor assembly 202 of FIGS. 2 and 3 is/are rigidly coupled. In some examples, the first surface 746 and/or the second surface 748 of the fin 736 provide(s) aerodynamic resistance to and/or against rotation of the stator assembly 204 in response to a slipstream and/or an airflow that engages and/or contacts the first surface 746 and/or the second surface 748 of the fin 736 while an aircraft (e.g., the aircraft 100 of FIG. 1) implementing the power generating apparatus 200 of FIGS. 2 and 3 is in motion (e.g., moving forward), while the aircraft is hovering, or while the aircraft is on the ground with its rotors rotating.

In some examples, the first surface 746 and the second surface 748 of the fin 736 are planar. In other examples, the first surface 746 and the second surface 748 of the fin 736 may be contoured and/or curved. The first surface 746, the second surface 748, and/or, more generally, the fin 736 may be of any length, width, and/or shape. In some examples, the length, width, and/or shape of the fin 736 is/are based on the extent and/or the degree of aerodynamic resistance that is desired from the stabilizer 706. For example, the length, width, and/or shape of the fin 736 may be optimized based on a desired aerodynamic resistance associated with the stabilizer 706. In some examples, the length, width, and/or shape of the fin 736 may be based on the rate of rotation (e.g., the maximum rate of rotation) of the rotor head 206 of FIGS. 2 and 3 to which the power generating apparatus 200 of FIGS. 2 and 3 is coupled. In some examples, the length, width, and/or shape of the fin 736 may be based on a desired amount and/or level of electrical power to be generated and/or supplied by the power generating apparatus 200 of FIGS. 2 and 3.

The aerodynamic resistance provided by the stabilizer 706 of the stator assembly 204 of FIGS. 2 and 3 causes the stator assembly 204 to rotate at a lower (e.g., substantially lower) rate relative to the rate at which the rotor assembly 202 of FIGS. 2 and 3 rotates when driven by the rotor head 206 of FIGS. 2 and 3. The difference between the rate of rotation of the rotor assembly 202 and the rate of rotation of the stator assembly 204 results in the current generating coil 428 of the rotor assembly 202 rotating relative to the magnets 726 of the stator assembly 204. Electrical power is generated and/or provided at and/or on the rotor head 206 of FIGS. 2 and 3 in response to the current generating coil 428 rotating relative to the magnets 726. The electrical power generated and/or provided at and/or on the rotor head 206 of FIGS. 2 and 3 may be supplied and/or provided (e.g., via a wired connection) to one or more electrical device(s) (e.g., transmitters, receivers, sensors, lights, etc.) located on one or more rotor blades that may be coupled to the rotor head 206.

Figure 11:
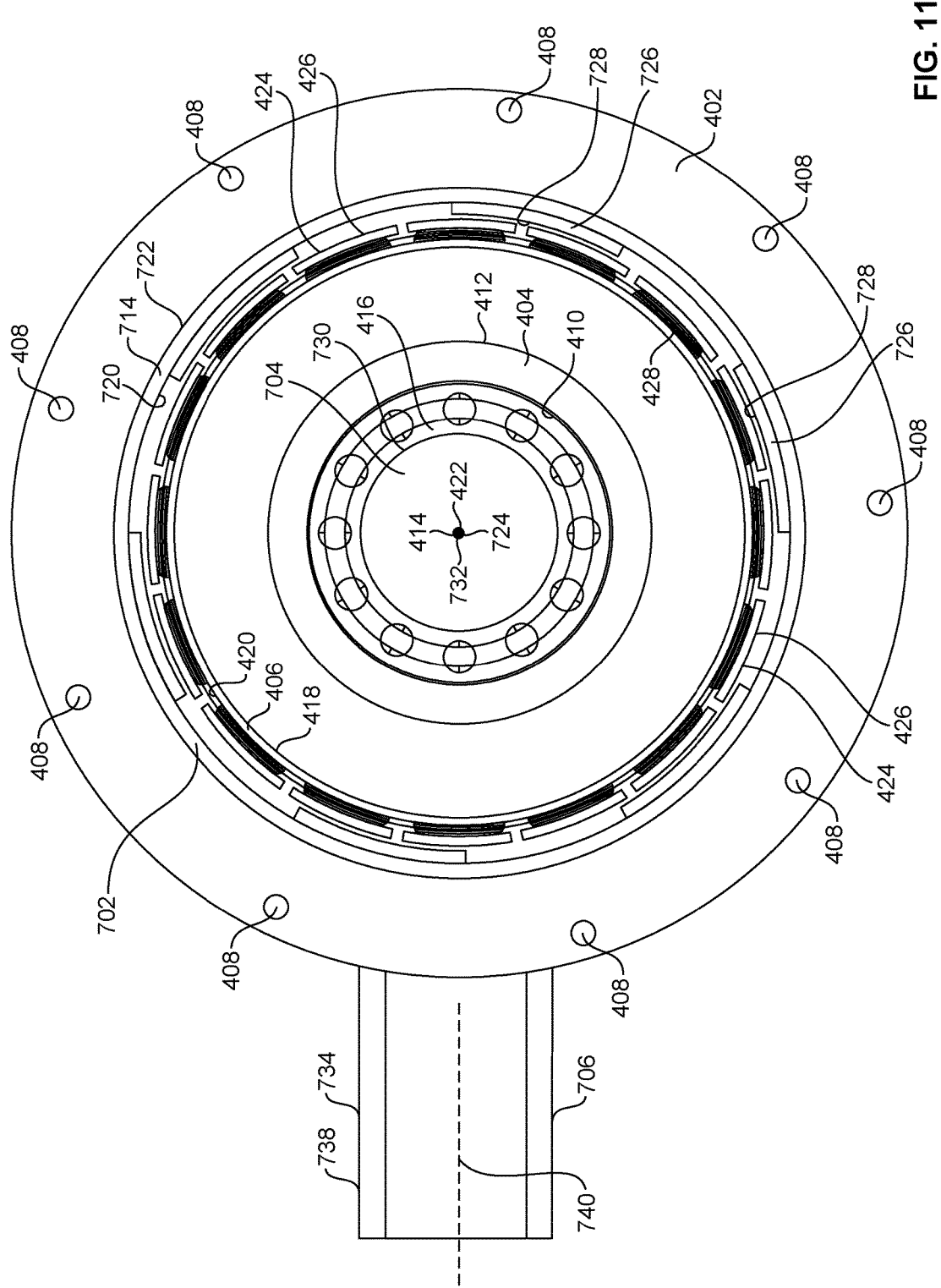
FIG. 11 is a phantom plan view of the example rotor assembly of FIGS. 2-6 coupled to the example stator assembly of FIGS. 2, 3 and 7-10.

FIG. 11 is a phantom plan view of the example rotor assembly 202 of FIGS. 2-6 coupled to the example stator assembly 204 of FIGS. 2, 3 and 7-10. In the illustrated example of FIG. 11, the first annulus 404 of the rotor assembly 202 circumscribes the core 704 of the stator assembly 204. The bearing(s) 416 are positioned between the inner surface 410 of the first annulus 404 and the outer surface 730 of the core 704. The bearing(s) 416 rotatably couple the core 704 to the first annulus 404, and/or, more generally, rotatably couple the stator assembly 204 to the rotor assembly 202. In the illustrated example of FIG. 11, the bearing(s) 416 are supported and/or carried by the first annulus 404 of the rotor assembly 202. In other examples, the bearing(s) may be supported and/or carried by the core 704 of the stator assembly 204.

As further shown in FIG. 11, the second annulus 406 of the rotor assembly 202 circumscribes the first annulus 404 of the rotor assembly 202, and the sidewall 714 of the stator assembly 204 circumscribes the second annulus 406 of the rotor assembly 202. The flanges 424 and the current generating coil 428 of the rotor assembly 202 are positioned between the second annulus 406 of the rotor assembly 202 and the sidewall 714 of the stator assembly 204 proximate the outer surface 420 of the second annulus 406. The magnets 726 of the stator assembly 204 are positioned between the second annulus 406 of the rotor assembly 202 and the sidewall 714 of the stator assembly 204 proximate the inner surface 720 of the sidewall 714. The contoured and/or curved inner surfaces 728 of the magnets 726 face toward and are complementary to the contoured and/or curved outer surfaces 426 of the flanges 424. The contoured and/or curved inner surfaces 728 of the magnets 726 also face toward the current generating coil 428. The rotor assembly 202 is rotatable relative to the stator assembly 204 to generate and/or provide electrical power at and/or on a rotor head (e.g., the rotor head 206 of FIGS. 2 and 3) to which the base 402 of the rotor assembly 202 is coupled.

Figure 12:
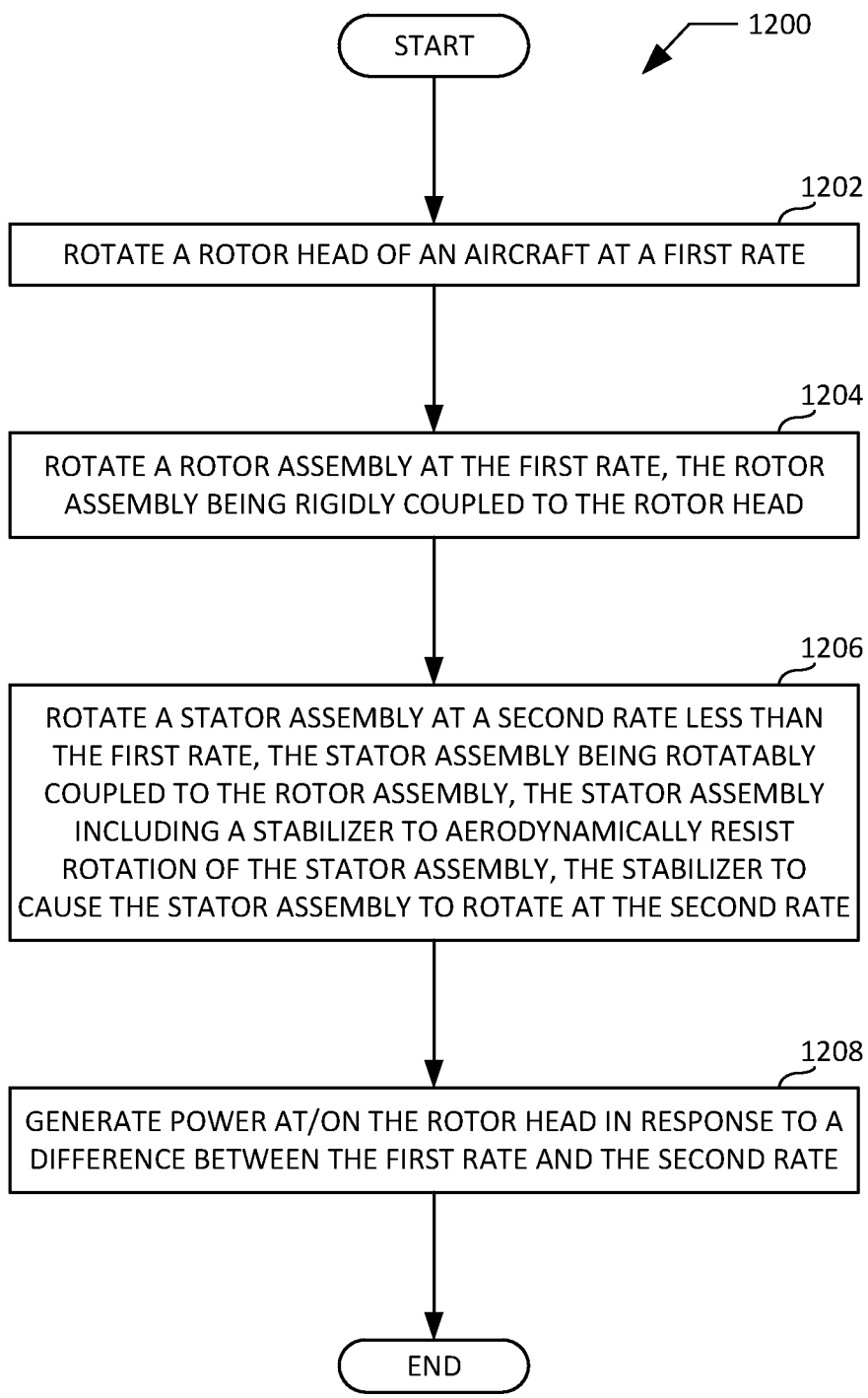
FIG. 12 is a flowchart representative of an example method for implementing the example power generating apparatus of FIGS. 2-11 to generate electrical power at and/or on a rotor head of an aircraft.

FIG. 12 is a flowchart representative of an example method 1200 for implementing the example power generating apparatus 200 of FIGS. 2-11 to generate electrical power at and/or on a rotor head of an aircraft. The method 1200 of FIG. 12 begins with rotating a rotor head of an aircraft at a first rate (block 1202). For example, the rotor head 206 of FIGS. 2 and 3 may be rotated at a first rate (e.g., two hundred revolutions per minute).

The method 1200 of FIG. 12 includes rotating a rotor assembly at the first rate (block 1204). For example, the rotor assembly 202 of FIGS. 2-6 and 11 may be rotated at the first rate (e.g., two hundred revolutions per minute). The rotor assembly is rigidly coupled to the rotor head. For example, the rotor assembly 202 of FIGS. 2-6 and 11 is rigidly coupled to the rotor head 206 of FIGS. 2 and 3.

The method 1200 of FIG. 12 includes rotating a stator assembly at a second rate less than the first rate (block 1206). For example, the stator assembly 204 of FIGS. 2, 3 and 7-11 may be rotated at a second rate (e.g., one revolution per minute) that is less (e.g., substantially less) than the first rate. The stator assembly is rotatably coupled to the rotor assembly. For example, the stator assembly 204 of FIGS. 2, 3 and 7-11 is rotatably coupled to the rotor assembly 202 of FIGS. 2-6 and 11. The stator assembly includes a stabilizer to aerodynamically resist rotation of the stator assembly. The stabilizer is to cause the stator assembly to rotate at the second rate. For example, the stator assembly 204 of FIGS. 2, 3 and 7-11 includes the stabilizer 706 (e.g., the shaft 734 and the fin 736) to aerodynamically resist rotation of the stator assembly 204. The stabilizer 706 causes the stator assembly 204 of FIGS. 2, 3 and 7-11 to rotate at the second rate.

The method 1200 of FIG. 12 includes generating electrical power at and/or on the rotor head in response to a difference between the first rate and the second rate (block 1208). For example, electrical power may be generated at and/or on the rotor head 206 of FIGS. 2 and 3 in response to a difference between the first rate of rotation of the rotor assembly 202 of FIGS. 2-6 and 11 and the second rate of rotation of the stator assembly 204 of FIGS. 2, 3 and 7-11. In some examples, the rotor assembly includes a current generating coil, the stator assembly includes a magnet, and the current generating coil rotates relative to the magnet to generate the electrical power based on the difference between the first rate and the second rate. For example, the rotor assembly 202 of FIGS. 2-6 and 11 includes the current generating coil 428, the stator assembly 204 of FIGS. 2, 3 and 7-11 includes the magnets 726, and the current generating coil 428 rotates relative to the magnets 726 to generate the electrical power based on the difference between the first rate and the second rate. Following block 1208, the example method 1200 of FIG. 12 ends.

From the foregoing, it will be appreciated that the disclosed methods and apparatus advantageously generate electrical power on rotor heads of aircraft without requiring an electrical connection between the rotor head and the airframe of the aircraft, and without the need for independent battery power. The disclosed methods and apparatus generate electrical power on rotor heads of aircraft in a manner that advantageously requires less maintenance and is less costly relative to conventional slip ring and/or roll ring systems. The disclosed methods and apparatus also generate electrical power on rotor heads of aircraft in a manner that advantageously avoids the down time associated with replacing and/or recharging batteries, or having to limit flight times to the duration of a battery, as is typically necessary in conventional wireless systems.

In some examples, an apparatus is disclosed. In some disclosed examples, the apparatus comprises a rotor assembly and a stator assembly. In some disclosed examples, the rotor assembly is rigidly coupled to a rotor head of an aircraft. In some disclosed examples, the rotor assembly is to rotate at a first rate as the rotor head rotates at the first rate. In some disclosed examples, the stator assembly is rotatably coupled to the rotor assembly. In some disclosed examples, the stator assembly includes a stabilizer to aerodynamically resist rotation of the stator assembly. In some disclosed examples, the stabilizer is to cause the stator assembly to rotate at a second rate less than the first rate.

In some disclosed examples, the rotor assembly includes a current generating coil and the stator assembly includes a magnet. In some disclosed examples, the current generating coil is to rotate relative to the magnet based on a difference between the first rate and the second rate. In some disclosed examples, the current generating coil is to generate electrical power at the rotor head in response to the difference between the first rate and the second rate. In some disclosed examples, the current generating coil is not electrically coupled to an airframe of the aircraft.

In some disclosed examples, the electrical power generated by the current generating coil is to be provided to an electrical device mounted on the rotor head or on a rotor blade of the aircraft. In some disclosed examples, the rotor blade is coupled to the rotor head.

In some disclosed examples, the aircraft is a helicopter, and the rotor head is associated with a main rotor of the helicopter.

In some disclosed examples, the rotor assembly includes a base, a first annulus extending transversely from the base, and a second annulus extending transversely from the base and circumscribing the first annulus.

In some disclosed examples, the apparatus further comprises a bearing, flanges, and a current generating coil. In some disclosed examples, the bearing extends inwardly from an inner surface of the first annulus. In some disclosed examples, the flanges extend outwardly from an outer surface of the second annulus. In some disclosed examples, respective ones of the flanges are radially spaced about the outer surface of the second annulus. In some disclosed examples, the current generating coil is wrapped around the outer surface of the second annulus and confined by the flanges.

In some disclosed examples, the stator assembly includes a lid, a core extending transversely from the lid, and a sidewall extending from the lid and circumscribing the core, the first annulus, and the second annulus. In some disclosed examples, the core is received in the bearing to rotatably couple the stator assembly to the rotor assembly. In some disclosed examples, the stabilizer is coupled to the sidewall.

In some disclosed examples, the stabilizer includes a shaft and a fin. In some disclosed examples, the shaft extends outwardly from an outer surface of the sidewall. In some disclosed examples, the fin extends outwardly from an outer surface of the shaft. In some disclosed examples, the fin is oriented in a plane that is not parallel to a plane of rotation of the rotor head.

In some disclosed examples, the apparatus further comprises magnets extending inwardly from an inner surface of the sidewall. In some disclosed examples, respective ones of the magnets are radially spaced about the inner surface of the sidewall. In some disclosed examples, inner surfaces of the magnets face toward outer surfaces of the flanges and toward the current generating coil. In some disclosed examples, the inner surfaces of the magnets have a first contoured shape that is complementary to a second contoured shape of the outer surfaces of the flanges.

In some examples, an aircraft is disclosed. In some disclosed examples, the aircraft comprises a rotor head, a rotor assembly, and a stator assembly. In some disclosed examples, the rotor assembly is rigidly coupled to the rotor head. In some disclosed examples, the rotor assembly is to rotate at a first rate as the rotor head rotates at the first rate.

In some disclosed examples, the rotor assembly includes a base, a first annulus extending transversely from the base, and a second annulus extending transversely from the base and circumscribing the first annulus. In some disclosed examples, the stator assembly is rotatably coupled to the rotor assembly. In some disclosed examples, the stator assembly includes a stabilizer to aerodynamically resist rotation of the stator assembly. In some disclosed examples, the stabilizer is to cause the stator assembly to rotate at a second rate less than the first rate. In some disclosed examples, the stator assembly further includes a lid, a core extending transversely from the lid, and a sidewall extending from the lid and circumscribing the core, the first annulus, and the second annulus. In some disclosed examples, the core is received in a bearing extending inwardly from an inner surface of the first annulus to rotatably couple the stator assembly to the rotor assembly.

In some disclosed examples, the rotor assembly includes a current generating coil and the stator assembly includes a magnet. In some disclosed examples, the current generating coil is to rotate relative to the magnet based on a difference between the first rate and the second rate. In some disclosed examples, the current generating coil is to generate electrical power at the rotor head in response to the difference between the first rate and the second rate.

In some examples, a method is disclosed. In some disclosed examples, the method comprises rotating a rotor head of an aircraft at a first rate. In some disclosed examples, the method further comprises rotating a rotor assembly at the first rate. In some disclosed examples, the rotor assembly is rigidly coupled to the rotor head. In some disclosed examples, the method further comprises rotating a stator assembly at a second rate less than the first rate. In some disclosed examples, the stator assembly is rotatably coupled to the rotor assembly. In some disclosed examples, the stator assembly includes a stabilizer to aerodynamically resist rotation of the stator assembly. In some disclosed examples, the stabilizer is to cause the stator assembly to rotate at the second rate.

In some disclosed examples, the rotor assembly includes a current generating coil and the stator assembly includes a magnet. In some disclosed examples, the current generating coil is to rotate relative to the magnet based on a difference between the first rate and the second rate. In some disclosed examples, the method further comprises generating electrical power at the rotor head via the current generating coil in response to the difference between the first rate and the second rate. In some disclosed examples, the current generating coil is not electrically coupled to an airframe of the aircraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a rotor assembly rigidly coupled to a rotor head of an aircraft, the rotor assembly to rotate at a first rate as the rotor head rotates at the first rate; and
a stator assembly rotatably coupled to the rotor assembly, the stator assembly including a sidewall and a stabilizer extending from the sidewall, the stabilizer to aerodynamically resist rotation of the stator assembly, the stabilizer to cause the stator assembly to rotate at a second rate less than the first rate.

2. The apparatus of claim 1, wherein the rotor assembly includes a current generating coil and the stator assembly includes a magnet, the current generating coil to rotate relative to the magnet based on a difference between the first rate and the second rate.

3. The apparatus of claim 2, wherein the current generating coil is to generate electrical power at the rotor head in response to the difference between the first rate and the second rate.

4. The apparatus of claim 3, wherein the current generating coil is not electrically coupled to an airframe of the aircraft.

5. The apparatus of claim 3, wherein the electrical power generated by the current generating coil is to be provided to an electrical device mounted on the rotor head or on a rotor blade of the aircraft, the rotor blade being coupled to the rotor head.

6. The apparatus of claim 1, wherein the aircraft is a helicopter, the rotor head being associated with a main rotor of the helicopter.

7. The apparatus of claim 1, wherein the rotor assembly includes a base, a first annulus extending transversely from the base, and a second annulus extending transversely from the base and circumscribing the first annulus.

8. The apparatus of claim 7, further comprising:
a bearing extending inwardly from an inner surface of the first annulus;
flanges extending outwardly from an outer surface of the second annulus, respective ones of the flanges being radially spaced about the outer surface of the second annulus; and
a current generating coil wrapped around the outer surface of the second annulus and confined by the flanges.

9. The apparatus of claim 8, wherein the stator assembly includes a lid and a core extending transversely from the lid, the sidewall extending from the lid and circumscribing the core, the first annulus, and the second annulus, the core being received in the bearing to rotatably couple the stator assembly to the rotor assembly.

10. The apparatus of claim 9, wherein the stabilizer includes:
a shaft extending outwardly from an outer surface of the sidewall; and
a fin extending outwardly from an outer surface of the shaft, the fin being oriented in a plane that is not parallel to a plane of rotation of the rotor head.

11. The apparatus of claim 9, further comprising magnets extending inwardly from an inner surface of the sidewall, respective ones of the magnets being radially spaced about the inner surface of the sidewall.

12. The apparatus of claim 11, wherein inner surfaces of the magnets face toward outer surfaces of the flanges and toward the current generating coil.

13. The apparatus of claim 12, wherein the inner surfaces of the magnets have a first contoured shape that is complementary to a second contoured shape of the outer surfaces of the flanges.

14. An aircraft, comprising:
a rotor head;
a rotor assembly rigidly coupled to the rotor head, the rotor assembly to rotate at a first rate as the rotor head rotates at the first rate, the rotor assembly including a base, a first annulus extending transversely from the base, and a second annulus extending transversely from the base and circumscribing the first annulus; and
a stator assembly rotatably coupled to the rotor assembly, the stator assembly including a stabilizer to aerodynamically resist rotation of the stator assembly, the stabilizer to cause the stator assembly to rotate at a second rate less than the first rate, the stator assembly further including a lid, a core extending transversely from the lid, and a sidewall extending from the lid and circumscribing the core, the first annulus, and the second annulus, the core being received in a bearing extending inwardly from an inner surface of the first annulus to rotatably couple the stator assembly to the rotor assembly, the stabilizer extending from the sidewall.

15. The aircraft of claim 14, wherein the rotor assembly includes a current generating coil and the stator assembly includes a magnet, the current generating coil to rotate relative to the magnet based on a difference between the first rate and the second rate.

16. The aircraft of claim 15, wherein the current generating coil is to generate electrical power at the rotor head in response to the difference between the first rate and the second rate.

17. A method, comprising:
rotating a rotor head of an aircraft at a first rate;
rotating a rotor assembly at the first rate, the rotor assembly being rigidly coupled to the rotor head; and
rotating a stator assembly at a second rate less than the first rate, the stator assembly being rotatably coupled to the rotor assembly, the stator assembly including a sidewall and a stabilizer extending from the sidewall, the stabilizer to aerodynamically resist rotation of the stator assembly, the stabilizer to cause the stator assembly to rotate at the second rate.

18. The method of claim 17, wherein the rotor assembly includes a current generating coil and the stator assembly includes a magnet, the current generating coil to rotate relative to the magnet based on a difference between the first rate and the second rate.

19. The method of claim 18, further comprising generating electrical power at the rotor head via the current generating coil in response to the difference between the first rate and the second rate.

20. The method of claim 19, wherein the current generating coil is not electrically coupled to an airframe of the aircraft.

* * * * *